US011599298B1

United States Patent
B N et al.

(10) Patent No.: US 11,599,298 B1
(45) Date of Patent: Mar. 7, 2023

(54) STORAGE SYSTEM AND METHOD FOR PREDICTION-BASED PRE-ERASE OF BLOCKS TO IMPROVE SEQUENTIAL PERFORMANCE

(71) Applicant: Western Digital Technologies, Inc., San Jose, CA (US)

(72) Inventors: Sabith Ali B N, Karnataka (IN); Lakshmi Sowjanya Sunkavelli, Bangalore (IN); Silky Mohanty, Bengaluru (IN); Noor Mohamed A A, Kumbakonam (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/482,690

(22) Filed: Sep. 23, 2021

(51) Int. Cl.
*G06F 3/06* (2006.01)

(52) U.S. Cl.
CPC ............ *G06F 3/0652* (2013.01); *G06F 3/064* (2013.01); *G06F 3/0611* (2013.01); *G06F 3/0656* (2013.01); *G06F 3/0659* (2013.01); *G06F 3/0679* (2013.01)

(58) Field of Classification Search
CPC ...... G06F 3/0611; G06F 3/064; G06F 3/0652; G06F 3/0656; G06F 3/0659; G06F 3/0679

See application file for complete search history.

(56) References Cited

U.S. PATENT DOCUMENTS

| | | | | |
|---|---|---|---|---|
| 2008/0082596 | A1* | 4/2008 | Gorobets | G06F 12/0253 |
| 2011/0213913 | A1* | 9/2011 | Yao | G06F 12/0246 |
| | | | | 711/E12.001 |
| 2013/0279248 | A1* | 10/2013 | Shepard | G11C 16/3418 |
| | | | | 365/185.03 |
| 2016/0027518 | A1* | 1/2016 | Zettsu | G06F 13/161 |
| | | | | 365/185.12 |
| 2016/0054931 | A1* | 2/2016 | Romanovsky | G06F 3/0643 |
| | | | | 711/103 |
| 2016/0141041 | A1* | 5/2016 | Yang | G11C 11/5635 |
| | | | | 365/185.11 |
| 2017/0123972 | A1* | 5/2017 | Gopinath | G06F 3/0616 |
| 2020/0073571 | A1* | 3/2020 | Chen | G06N 5/04 |
| 2021/0200448 | A1* | 7/2021 | Chen | G06F 3/0659 |

* cited by examiner

*Primary Examiner* — Larry T Mackall
(74) *Attorney, Agent, or Firm* — Crowell & Moring LLP

(57) ABSTRACT

A storage system erases blocks of memory prior to writing data to the blocks. Instead of erasing the blocks at the time the write operations are executed, the storage system pre-erases the blocks, which can improve performance. However, because program failure errors can occur if the blocks sit empty for a relatively-long period of time prior to programming, the storage system pre-erases the blocks upon a prediction that a host will send sequential write commands to the storage system that will use the blocks. Additionally or alternatively, the storage system can pre-erase a block upon determining that the number of write commands in a command queue in the storage system is above a threshold that represents a number of write commands needed to fill the block with data.

20 Claims, 6 Drawing Sheets

STORAGE SYSTEM AND METHOD FOR PREDICTION-BASED PRE-ERASE OF BLOCKS TO IMPROVE SEQUENTIAL PERFORMANCE

BACKGROUND

Storage systems can be used to store data from a host. In some storage systems, a block of memory is erased prior to writing data to the block. Typically, the block is erased as part of the write operation, just before the data is written. This is because program failure errors can occur if a block remains empty for some period of time prior to programming. This is especially true in memories that store multiple (e.g., four or more) bits per cell.

DETAILED DESCRIPTION

The following embodiments generally relate to a storage system and method for prediction-based pre-erase of blocks to improve sequential performance. In one embodiment, a storage system is presented comprising a memory and a controller. The controller is configured to predict that a host will send sequential write commands to the storage system; prior to receiving the sequential write commands from the host, pre-erase a plurality of blocks in the memory; receive the sequential write commands from the host; and use the pre-erased plurality of blocks to store data written by the sequential write commands. In another embodiment, a method is provided comprising determining that a number of write commands in a command queue in the storage system is above a threshold; in response to determining that the number of write commands in the command queue is above the threshold, pre-erasing a block in the memory; and executing the write commands, wherein the pre-erased block is used to store data written by the write commands. In yet another embodiment, a storage system is provided comprising a memory; and one or both of the following: means for passive pre-erasing of a block in the memory based on a machine-learning prediction; and means for active pre-erasing of a block in the memory based on a command-queue-based prediction. Other embodiments are provided, and each of these embodiments can be used alone or in combination.

Figure 1A:
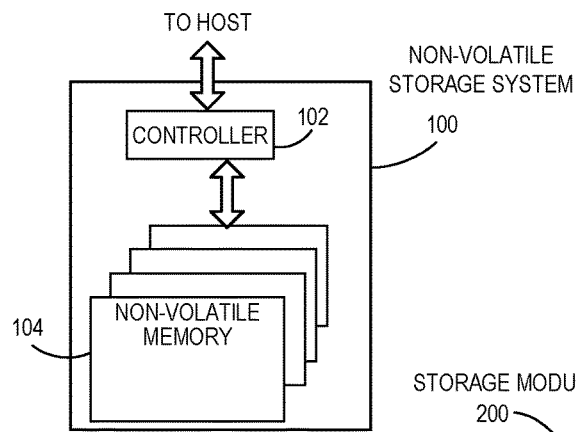
FIG. 1A is a block diagram of a non-volatile storage system of an embodiment.
Figure 1B:
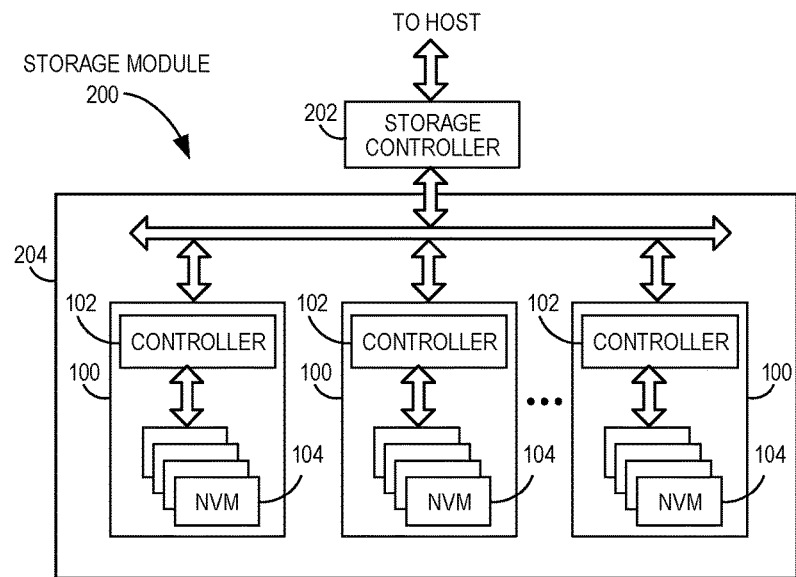
FIG. 1B is a block diagram illustrating a storage module of an embodiment.
Figure 1C:
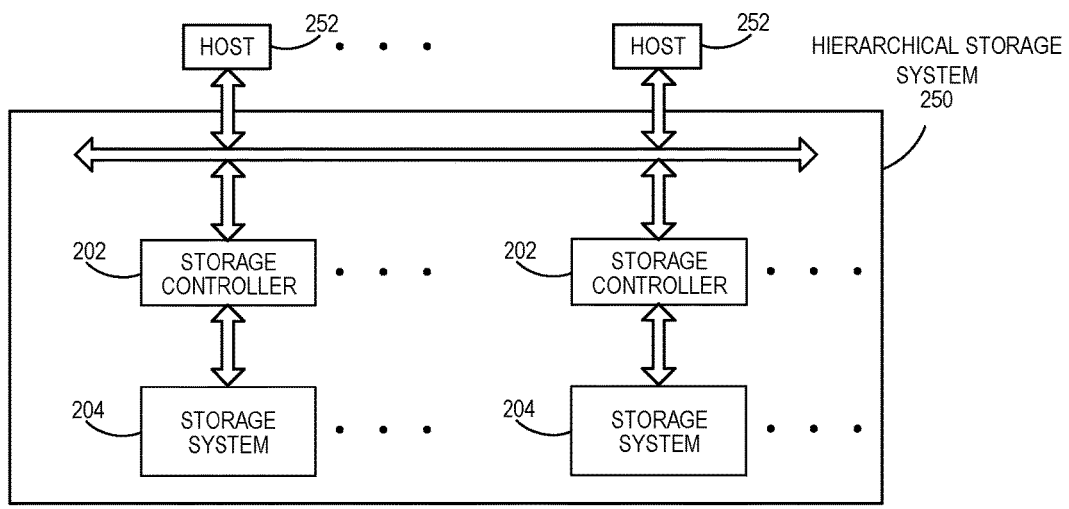
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
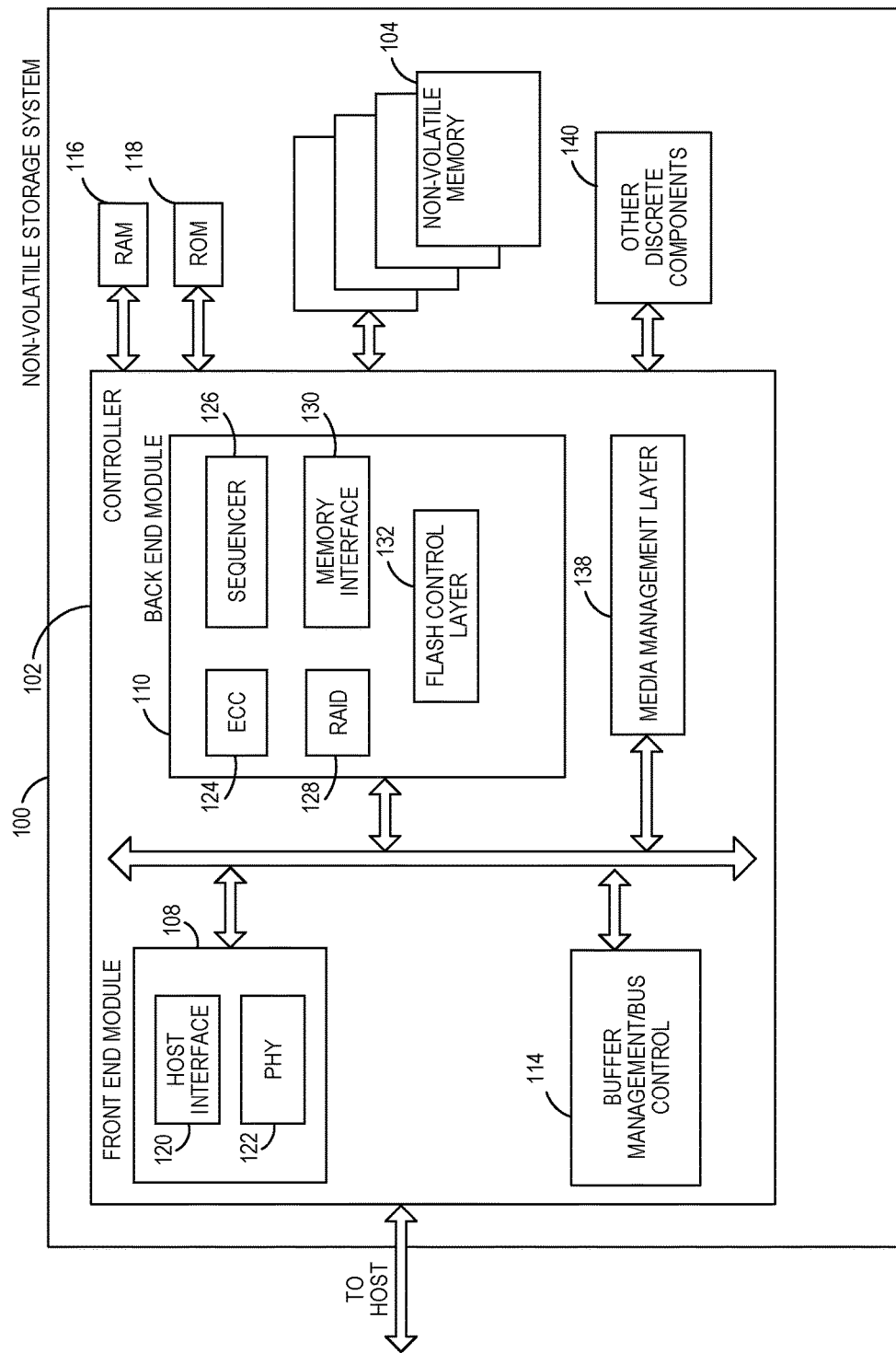
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences; such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
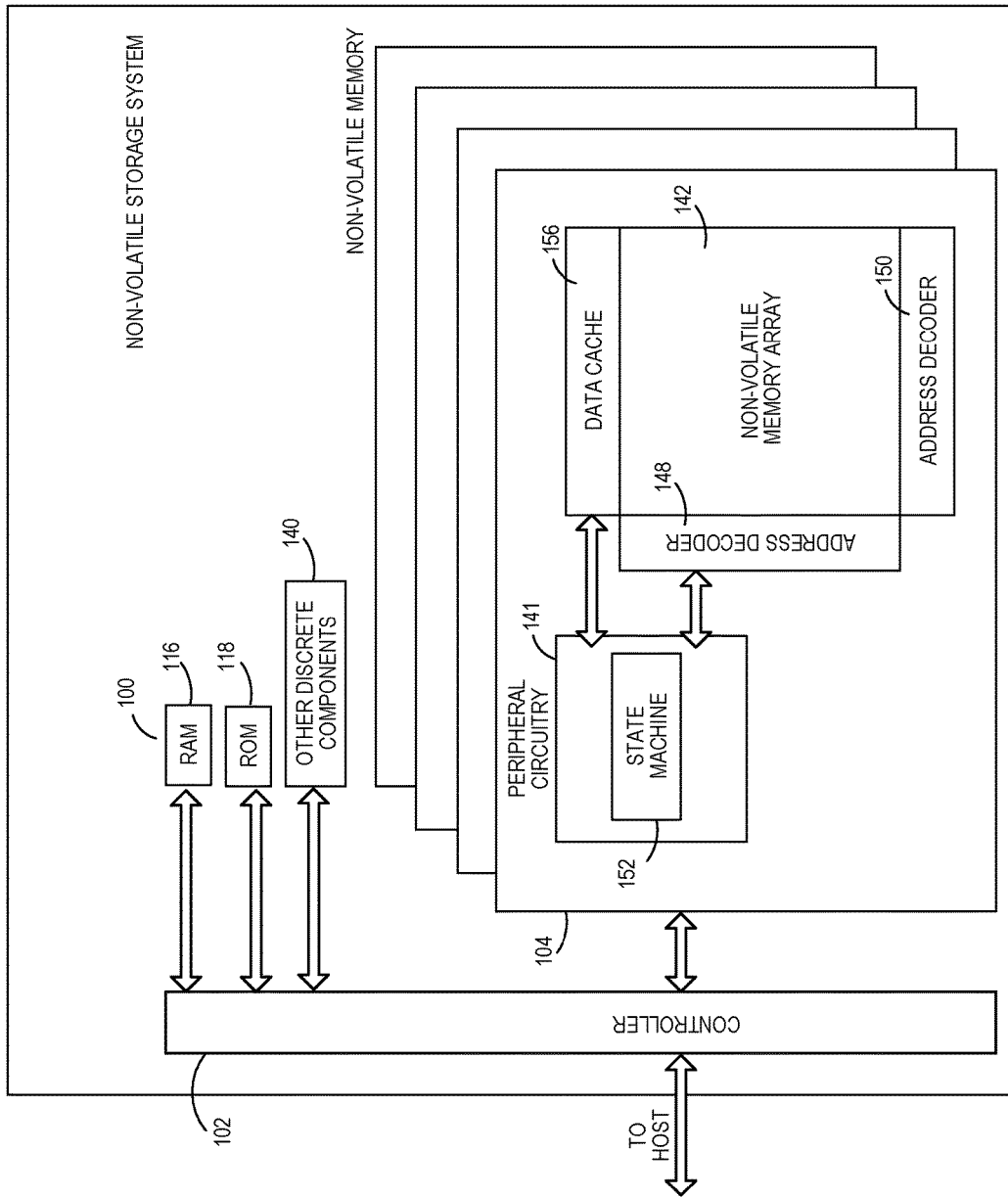
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any, suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FM understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
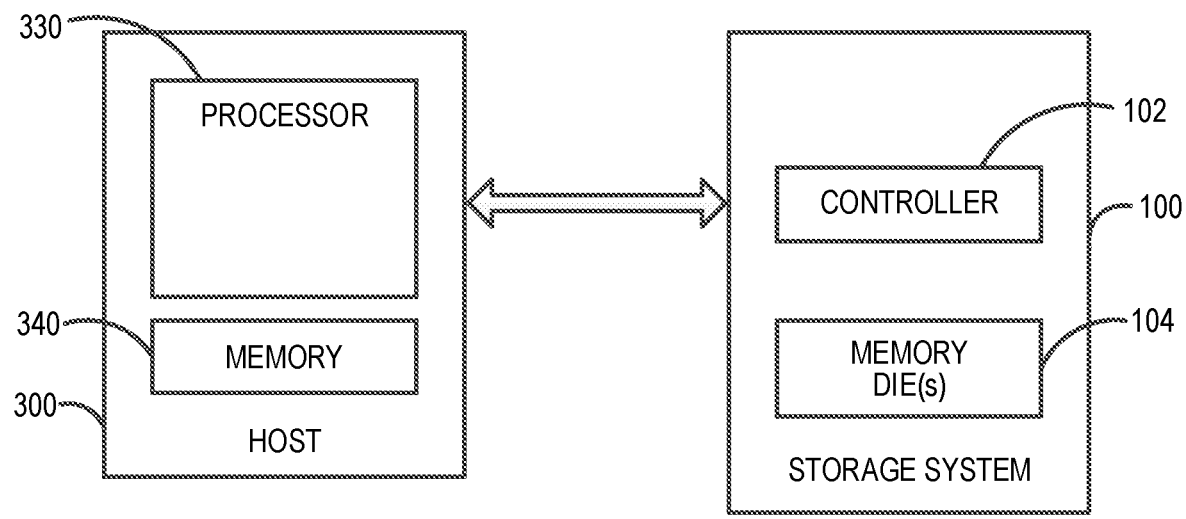
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, in some storage systems (e.g., those that use flash memory), a block of memory is erased prior to writing data to the block. Typically the block is erased as part of the write operation, just before the data is written. This is because program failure errors can occur if a block remains empty for a period of time prior to programming. This problem is sometimes referred to as the erase bake data retention (EBDR) problem. This problem can be especially problematic for memories that store multiple (e.g., four or more) bits per cell.

An erase operation usually takes around five microseconds per block. This can lead to dropping of performance for sequential write operations, as the erase operation is done along with the programming of blocks in the foreground. To improve performance, it may be desirable to erase the blocks in advance of the commencement of a write operation ("pre-erase") during idle time of the storage system (e.g., when the storage system is not reading or writing to the memory in executing a host read or write command). However, because of the EBDR problem, doing so would involve the high risk of program failure if the pre-erased block is not used for a certain period of time. As such, the storage system typically performs an erase operation in the foreground without any pipelining.

The following embodiments can be used to improve burst and sustained sequential performance by erasing blocks in advance (before starting the programming of the blocks) while avoiding the risk of occurrence of program failures due to EBDR. In general, some of these embodiments provide prediction-based schemes for improving sequential performance. One implementation improves sequential burst performance by a prediction-based passive erase, while another implementation improves sequential burst performance by a prediction-based active erase. It should be noted that these are merely examples and other implementations can be used. Also, the below details should not be read into the claims unless expressly recited therein.

In one embodiment that uses a prediction-based passive erase method, the controller 102 of the storage system 100 predicts when the host 300 will send sequential write commands to the storage system 100 and pre-erases a plurality of blocks in the memory 104. When the controller 102 actually receives the sequential write commands from the host 300, the controller 102 can use the pre-erased plurality of blocks to store data written by the sequential write commands. That way, the controller 102 can avoid performing an erase operation on the plurality of blocks during the foreground operation, thereby avoiding the decrease in performance noted above.

While the controller 102 can use any suitable prediction technique, in one embodiment, the controller 102 uses a machine learning model (algorithm) to do the prediction. That is, the controller 102 can use machine learning to predict that the next writes will be burst sequential and erase the required number of blocks during idle time based on the prediction. This embodiment will now be discussed in conjunction with the example presented in the flow chart 400 in FIG. 4.

Figure 4:
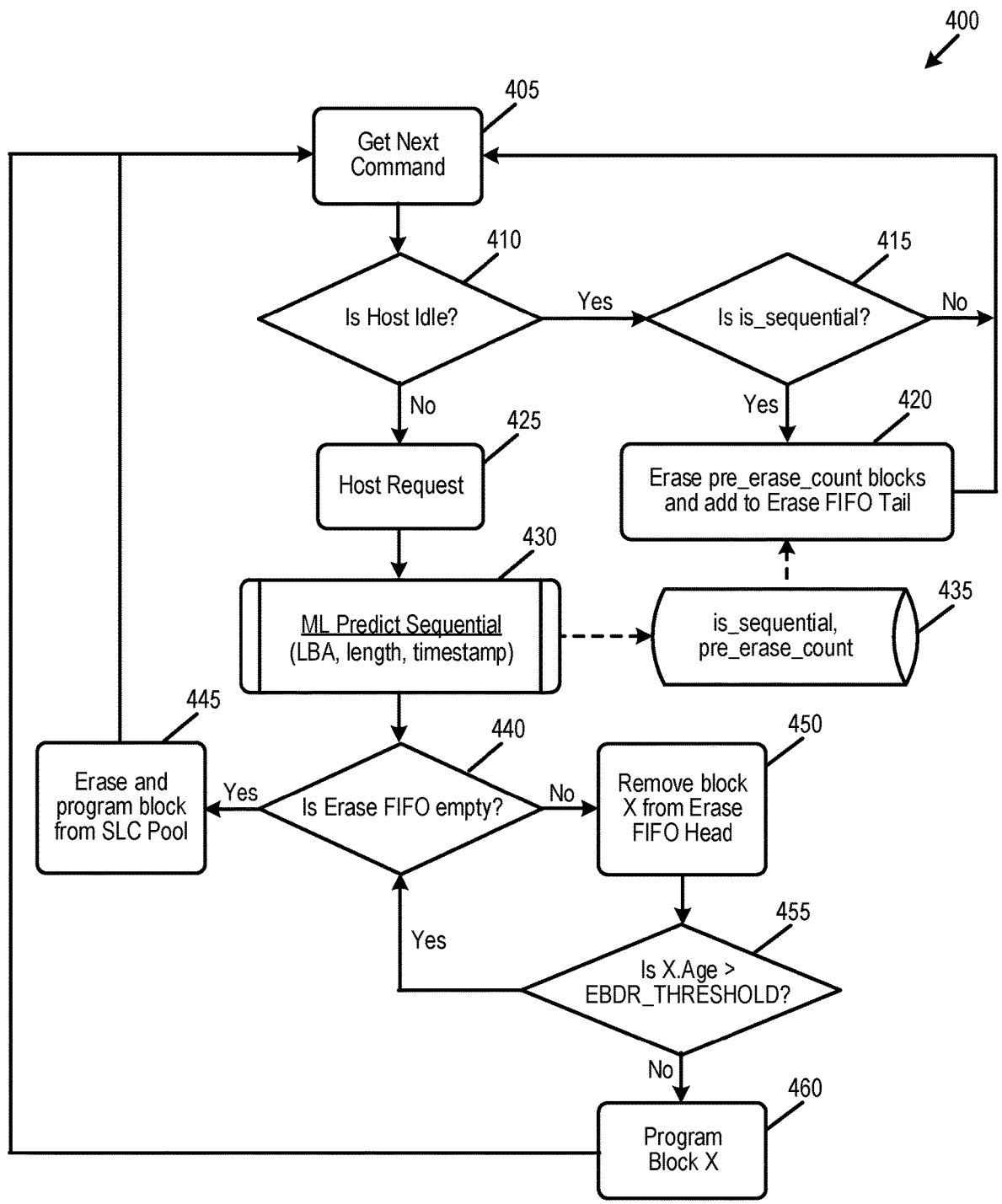
FIG. 4 is a flow chart of a method of an embodiment for passive pre-erasing of blocks based on a machine-learning prediction.

As shown in FIG. 4, the controller 102 of the storage system 100 in this embodiment determines whether the host 300 is idle (e.g., whether the host 300 is currently not performing an active read or write operation in the memory 104) (act 410). If the host 300 is not idle, the controller 102 receive a read or write request (in this example, a write command) from the host 300 (act 425). The controller 102 then inputs various information about the command into its machine-learning model (act 430). Such information can include, but is not limited to, a logical block address (LBA) in the command, length (e.g., number of blocks needed for the data to be written the write command(s)), a timestamp of the command, and a frequency of host writes and reads. This information is fed to the machine-learning model as training data. This is represented by act 430 in the flow chart 400 by the phrase "ML_Predict_Sequential (LBA, length, timestamp)," which refers to the machine-language-based algorithm taking LBA, length, and timestamp/frequency of writes as training data to predict sequentiality during the next write. The output of the machine-learning prediction would be whether or not the next host write commands will be sequential. This predicted outcome is represented in act 435 in the flow chart 400 by the phrase "is_sequential," and "pre_erase_count" refers to the predicted length of sequential data during the next write request. These results will be discussed further below.

In this embodiment, the storage system 100 contains a data structure that stores a list or some other representation of memory blocks that have been erased. In one particular implementation, that data structure is a first-in-first-out (FIFO) buffer and will be referred to herein as the Erase FIFO. So, before the controller 102 writes the data presented by the host 300 in the write command, the controller 102 determines if the Erase FIFO is empty (act 440). If the Erase FIFO is empty, the controller 102 does not have an available erased block to use, so the controller 102 erases a block in the memory 104 (e.g., from the SLC pool of free blocks) and then programs that block with the data in the write command (act 445). That is, if a block is not available in the Erase FIFO, a block can be allocated from the SLC pool, then erased and programmed. The controller 102 then gets the next command from the host 300 (act 405).

However, if the Erase FIFO is not empty, the controller 102 choses a block from the Erase FIFO (e.g., from the head of the Erase FIFO) (act 450) and potentially, writes the data in that block. In this particular embodiment, a time at which a block was erased is recorded. So, when the controller 102 choses a block from the Erase FIFO, it determines if the block was erased more than a threshold amount of time ago where the EBDR issue may cause a program failure (act 455). This is represented in act 455 in the flow chart 400 by the phrase "Is X.Age>EBDR_THRESHOLD." If the block has not aged beyond the threshold, the controller 102 programs the block with the data (act 460) and gets the next command from the host 300 (act 405). However, if the block has aged beyond the threshold, the method loops back to act 440.

Referring back to act 410, if the host 300 is idle, the controller 102 uses the idle time to potentially pre-erase blocks in the memory 104. More particularly, the controller 102 determines if the machine-learning model predicts that the host 300 will send a series of sequential write commands (act 415). If sequential write commands are not predicted, the controller 102 will not take any pre-erase action (which reduces the hot count of blocks by avoiding unnecessary erases) and will get the next command from the host 300, when available (act 405).

However, if sequential write commands are predicted, the controller 102 would predict the length of next burst write and, based on this information, calculate the number of blocks that would be used during the next burst write. The controller 102 would then pre-erase the required number of blocks predicted to be written by the sequential write commands and maintain these blocks in the Erase FIFO (e.g., by adding the addresses of those blocks at the tail of the Erase FIFO to make sure older pre-erased blocks are chosen first) (act 420). Age (based on a timestamp) is also maintained for these blocks. The controller 102 will then get the next command from the host 300 when available (act 405). In executing the next command, blocks in the Erase FIFO can be used directly for write without performing erase. This eliminates the erase time that would have come in the foreground during a sequential burst write in prior systems.

As noted above, a time check can be performed on the block before its use. For example, if the block in the Erase FIFO is not used after a time period of EBDR THRESHOLD (the maximum safe time the blocks can be kept erased without programming), they can be removed from the Erase FIFO and released to the SLC pool. This avoids the occurrence of program failure on the block, as the block is re-erased later before use.

The following is a use case that illustrates the operation of this embodiment. If the storage system 100 has a requirement for a one gigabyte (GB) burst performance, the controller 102 can pre-erase an initial one GB of blocks during idle time immediately once the storage system 100 is connected to the host 300. The first one GB burst write would be done without erase and, hence, provide increased burst performance. After the burst write, the controller 102 would switch to sustained sequential writes, during which the machine-learning training is done. During the next idle time, the next one GB of blocks can be erased (around 200 blocks can be erased in less than one second of idle time). At the next write, increased burst performance would be gained again. At any point, if the prediction goes wrong, blocks erased during idle time can be released back to available pool (e.g., of SLC blocks) if the age of pre-erased blocks exceeds the threshold time and then re-erased before programming. Thus, this embodiment provides the advantage of pre-erasing blocks without incurring the risks of a program failure.

In another embodiment, a prediction-based active erase method is used to improve sustained write performance. In this embodiment, the controller 102 of the storage system 100 determines if a number of write commands in a command queue in the storage system 100 is above a threshold. If it is, the controller 102 pre-erases a block in the memory 104 and uses that pre-erased block to store data when executing the write commands in the command queue. In one particular implementation, the storage system comprises a front-end module that contains the command queue and a back-end module that is configured to execute write commands in the command queue, and the pre-erasing occurs with the front-end module is busy. As such, pre-erase operations can be performed continuously in the background during sustained write operations without incurring the risks of program failure.

An example implementation of this embodiment will now be discussed in conjunction with the flow chart 500 in FIG. 5. In general, this example involves using command queue information from a front end of the controller 102 to predict a block-full condition and perform a pre-erase of a block (e.g., in phases (using segmented erase) when the memory 104 is not busy/when the controller 102 is performing flash translation layer (FTL) processing). The controller 102 in this embodiment queues a certain number of commands in the command queue in the front-end module before the commands are processed by the back-end module/FTL module. This information can be used to predict a block-full condition after a certain number of write requests.

Figure 5:
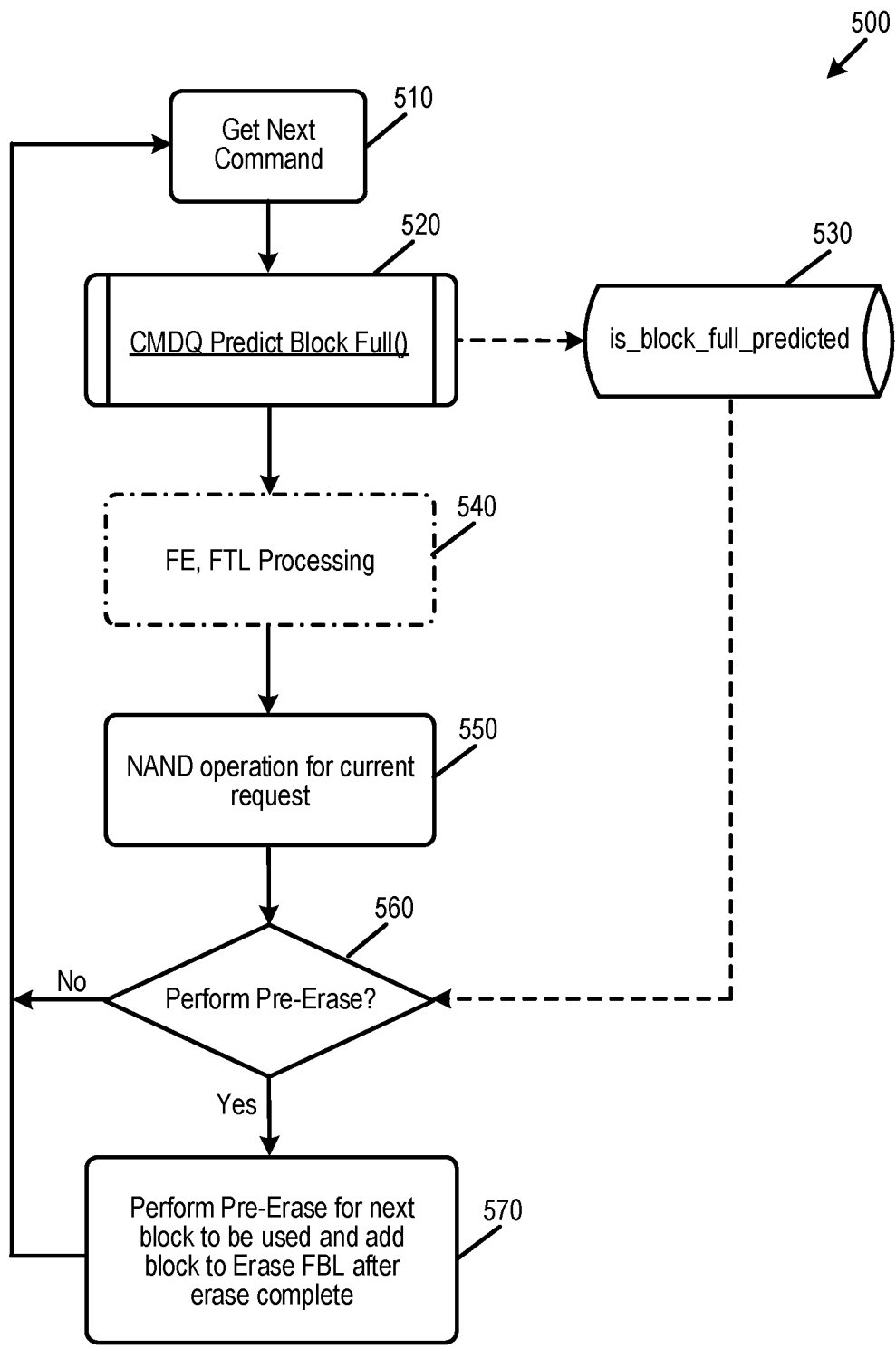
FIG. 5 is a flow chart of a method of an embodiment for active pre-erasing of blocks based on a command-queue-based prediction.

As shown in FIG. 5, the storage system 100 gets a write command from the host 300 and places it in the command queue of the front-end module of the controller 102 (act 510). Next, the controller 102 determines is there are enough write commands in the command queue to fill a block of the memory 104 when the write commands are executed (act 520). This is represented in act 520 by the phrase "CMDQ_Predict_Block_Full( )." which refers to a command-queue-based-algorithm that predicts a block-full condition based on unprocessed commands in the command queue. Since the command queue is used for prediction of a block-full condition, there would not be any scenario in which the blocks are pre-erased and the block is left open. This avoids any program failure due to EBDR.

Next, the controller 102 performs front-end module/FTL processing (act 540) and performs the memory operation for the current request (act 550). Then, the controller 102 determines whether it should perform a pre-erase operation on a block in the memory 104 (act 560). The controller 102 can do this by determining if the predicted outcome generated by the command-queue-based-algorithm is a block-full condition ("is block_full_predicted") (see 530 in FIG. 5). If a pre-erase is not to be perform (no block-full condition), the method loops back to act 510. However, if a pre-erase was performed, the controller 102 performs a pre-erase for the next block to be used in the memory 104 and adds the address of that block to an erase free-block list (FBL) after the erase is complete. That is, once a block-full condition is predicted, the controller 102 pre-erases a block in the memory 104 well in advance of the execution of the write commands that will file the block. As noted above, the controller 102 can perform the pre-erase in phases (a segmented erase) when the front-end module/FTL is processing and the memory 104 is free. In this way, the erase operation time is hidden from the host 300/end user.

It should be noted that this embodiment can be used alone or in conjunction with the above embodiment. When the embodiments are used together, they can potentially hide all erase time during sequential writes and improve both burst and sustained performance of the storage system 100 while avoiding the risk of any program failures due to stale pre-erased blocks.

There are many advantages associated with these embodiments. As noted above, these embodiments can be used to improve burst and sustained sequential performance. If the entire erase operation is done in the background for sequential write operations, sequential burst and sustained performance can be improved by around 5-10%. As another example, these embodiments can provide improved reliability because they prevent program failure that may occur due to EBDR as a consequence of pre-erasing the blocks. As yet another example, these embodiments can improve endurance because prediction-based pre-erase reduces the number of unnecessary erases of blocks and reduces hot count of the blocks.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a No configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
    a memory; and
    a controller configured to:
        perform garbage collection on a plurality of blocks in the memory;
        predict that a host will send sequential write commands to the storage system;
        prior to receiving the sequential write commands from the host, pre-erase the plurality of blocks in the memory, wherein pre-erasing the plurality of blocks comprises performing erase operations on the plurality of blocks that would otherwise be performed as part of write operations of the plurality of blocks;
        receive the sequential write commands from the host; and
        use the pre-erased plurality of blocks to store data written by the sequential write commands.

2. The storage system of claim 1, wherein the controller is further configured to store the data written by the sequential write commands as a foreground operation, and wherein because the plurality of blocks are pre-erased, the controller is further configured to avoid performing an erase operation on the plurality of blocks during the foreground operation.

3. The storage system of claim 1, wherein the controller is further configured to use a machine-learning model to predict that the host will send the sequential write commands to the storage system.

4. The storage system of claim 3, wherein inputs to the machine-learning model comprise at least one of the following items: a logical block address, a length of logical block addresses, a timestamp, a frequency of host writes, and a frequency of host reads.

5. The storage system of claim 1, wherein the controller is further configured to pre-erase the plurality of blocks during idle time.

6. The storage system of claim 1, wherein the controller is further configured to store addresses of the pre-erased plurality of blocks in a first-in-first-out (FIFO) buffer.

7. The storage system of claim 6, wherein the controller is further configured to remove an address of a block from the FIFO buffer in response to determining that the block has been in the buffer more than a threshold amount of time.

8. The storage system of claim 1, wherein the controller is further configured to:
    determine that a number of write commands in a command queue in the storage system is above a threshold; and
    in response to determining that the number of write commands in the command queue is above the threshold, pre-erase another block in the memory.

9. The storage system of claim 8, further comprising:
    a front-end module comprising the command queue; and
    a back-end module configured to execute the write commands.

10. The storage system of claim 8, wherein the controller is further configured to pre-erase the another block using a segmented erase process.

11. The storage system of claim 1, wherein the memory comprises a three-dimensional memory.

12. In a storage system comprising a memory, a method comprising:
    performing garbage collection on a block in the memory;
    determining that a number of write commands in a command queue in the storage system is above a threshold;
    in response to determining that the number of write commands in the command queue is above the threshold, pre-erasing the block in the memory, wherein pre-erasing the block comprises performing an erase operation on the block that would otherwise be performed as part of a write operation of the block; and
    executing the write commands, wherein the pre-erased block is used to store data written by the write commands.

13. The method of claim 12, wherein the storage system comprises a front-end module comprising the command queue and a back-end module configured to execute the write commands.

14. The method of claim 13, wherein the block in the memory is pre-erased in phases when the front-end module is busy.

15. The method of claim 12, wherein the threshold represents a number of write commands needed to fill the block with data.

16. The method of claim 12, further comprising:
    predicting that a host will send sequential write commands to the storage system; and prior to receiving the sequential write commands from the host, pre-erasing a plurality of blocks in the memory that will be used to store data written by the sequential write commands.

17. The method of claim 16, further comprising using a machine-learning model to predict that the host will send the sequential write commands to the storage system.

18. The method of claim 16, further comprising pre-erasing the plurality of blocks during idle time.

19. The method of claim 16, further comprising removing one of the plurality of pre-erased blocks from a pool of available blocks in response to determining that the one of the plurality of pre-erased blocks was pre-erased more than a threshold amount of time ago.

20. A storage system comprising:
   a memory;
   means for performing garbage collection on first and second blocks in the memory; and
   one or both of the following:
      means for passive pre-erasing of the first block in the memory based on a machine-learning prediction, wherein passive pre-erasing of the first block comprises performing an erase operation on the first block that would otherwise be performed as part of a write operation of the first block; and
      means for active pre-erasing of the second block in the memory based on a command-queue-based prediction, wherein active pre-erasing of the second block comprises performing an erase operation on the second block that would otherwise be performed as part of a write operation of the second block.

* * * * *